(No Model.)
W. WHITE.
CENTRIFUGAL AMALGAMATOR.
No. 399,590. Patented Mar. 12, 1889.
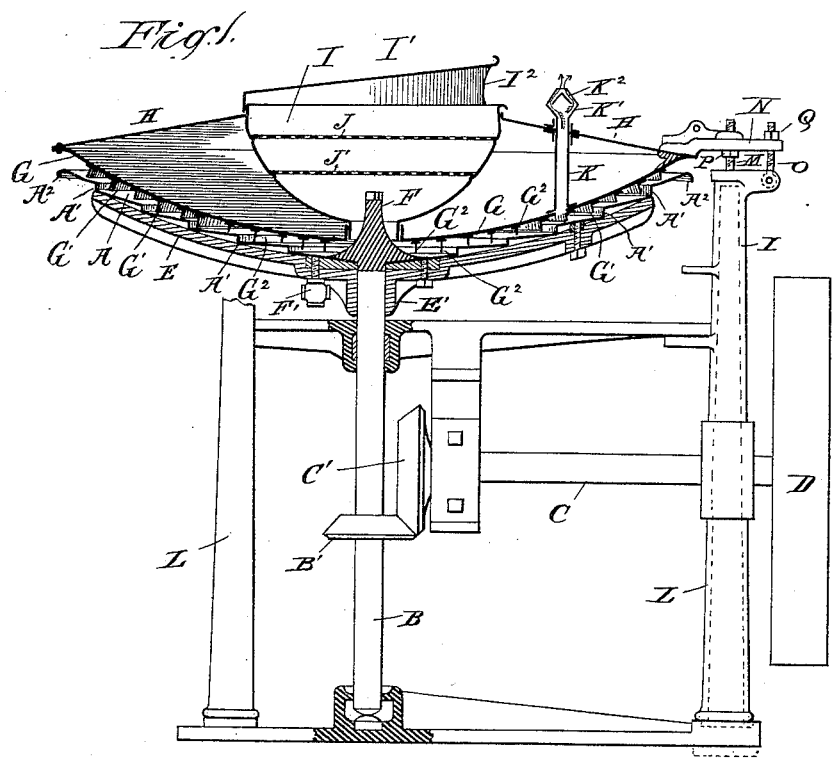
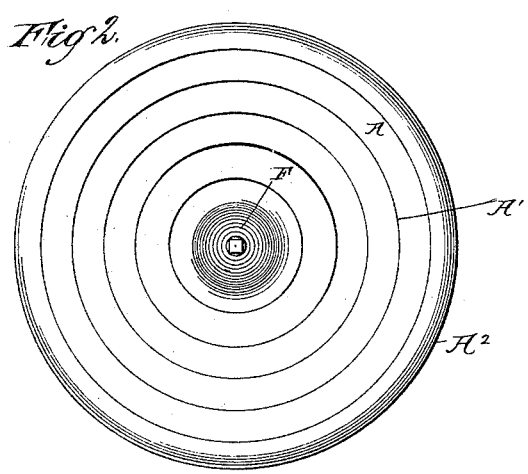
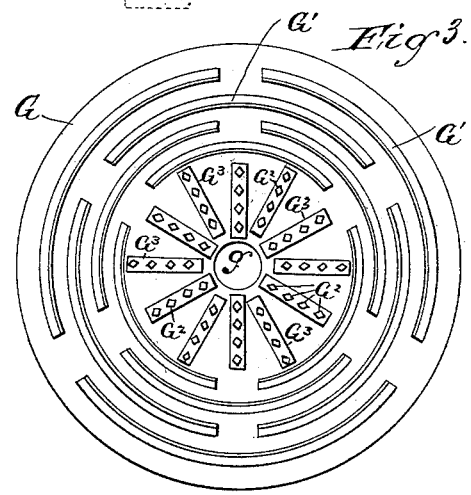
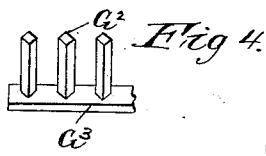
WITNESSES:
O. W. Benjamin
A. F. Green
INVENTOR,
William White
BY
Frank A. Fouts
ATTORNEY.
N. PETERS, Photo-Lithographer, Washington, D. C.

UNITED STATES PATENT OFFICE.

WILLIAM WHITE, OF MOUNT VERNON, ASSIGNOR TO JAMES B. BREWSTER AND RICHARD KELLEY, OF NEW YORK, N. Y.

CENTRIFUGAL AMALGAMATOR.

SPECIFICATION forming part of Letters Patent No. 399,590, dated March 12, 1889.

Application filed November 22, 1888. Serial No. 291,546. (No model.)

*To all whom it may concern:*

Be it known that I, WILLIAM WHITE, a citizen of the United States, and a resident of Mount Vernon, in the county of Westchester and State of New York, have invented certain new and useful Improvements in Centrifugal Amalgamators, of which the following is a specification.

This invention relates to centrifugal amalgamators, and its object is to improve the construction shown and described in my two Letters Patent of the United States, No. 355,958, granted January 11, 1887, and No. 368,363, granted August 16, 1887; and it consists in the parts which will be hereinafter specified, and pointed out in the claims.

Reference is to be had to the accompanying drawings, forming part of this specification, in which similar letters of reference indicate corresponding parts in all the views.

Figure 1 represents a central sectional elevation of the amalgamator. Fig. 2 is a plan view of the revoluble pan. Fig. 3 is a bottom plan view of the stationary disk, and Fig. 4 is an enlarged detail perspective view of the disk-pins and the bar to which they are fixed.

A revoluble pan, A, is rigidly secured to the upper end of a vertical shaft, B, said shaft being provided with a bevel-gear, B'. A horizontal shaft, C, is provided on its inner end with a bevel-gear, C', which meshes with the gear B', the outer end of the shaft C being provided with a pulley, D. The pan A aforesaid is mounted on a frame, E, the inner part of said frame being provided with a collar, E', which is fixed to the upper part of the shaft B. The upper face of the pan A is provided with a series of concentric steps, A', the outer part of the pan beyond the last step being inclined slightly upward and terminating in a downwardly-curved peripheral edge, A², as shown in Fig. 1. The upper face of the pan is also provided with a cone or tapering block, F, centrally fixed thereto. There is a discharge-pipe, F', in the bottom of the pan, through which the amalgam may be drawn off.

A convexed stationary disk, G, is mounted above the pan A, said disk being provided with a central opening, $g$, and with a series of concentric riffs, G', arranged to break joint; also provided with a series of pins, G², lying between the opening and riffs aforesaid. The pins G² are fixed to a bar, G³, and said bar is suitably secured to the under side of the disk. Each pin is practically wedge shape in cross-section. A top circular plate or cover, H, is fixed at its outer edge to the outer edge of the disk G. The plate H is provided with a central opening, in which is mounted a bowl-shaped hopper, I, and I' is a removable cap for said hopper, this cap being provided with a mouth or side opening, I².

J J' are two screens fixed within the hopper I and lying parallel, the upper screen being coarser than the lower one. A vent-tube, K, is fixed in openings in the plate H and disk G, so that the lower end of the tube communicates with the space between the pan and disk, while the upper end thereof opens into the space above the plate H, and said upper end is provided with an enlarged part, K', in which is fixed a conical hood, K², so as to leave an air-space between said enlarged part and hood, as indicated by the arrows in Fig. 1. Any desired number of these tubes may be employed. Only one, however, is shown.

The disk G, and parts connected thereto, are adjustably supported by columns L, which carry upwardly-extending threaded standards M, that pass through apertures formed in arms N, that are rigidly connected to the disk plate or cover H, while the columns L carry hinged eyebolts O, that may be turned up to enter slots formed in the ends of the arms N. The threaded standards M carry nuts P, which may be turned up or down to vary the distance between the pan and disk, and a proper adjustment having been obtained the disk is locked by turning down nuts Q, that are carried by the bolts O, as shown in Fig. 1. In practice three of the columns L are preferably employed.

The operation of the invention is as follows: The ore or pulp is fed into the hopper through the mouth I², the face of the pan having been previously charged with mercury. The said ore then passes through the screens, and thence onto the cone or tapering block F, and thence onto the rotary pan. The cone F causes the ore to spread outward away from the center of the pan to a point where the centrifugal force will be sufficient to act on the ore, causing it to move outward over the face of the pan in a rotary spiral course. The disk-pins serve to separate the pulp into small particles, so as to expose the gold and cause it to unite with the mercury, and the break-joint riffs also serve to effect an agitation and separation of the pulp for a like purpose.

The vent-tubes K serve to prevent a vacuum between the disk and pan, and the conical hood $K^2$ in the upper part of each tube serves to prevent any water or pulp from passing upward and out of said tube.

The pins $G^2$ are set so that they present a wedge-shaped edge to the line of travel, thereby causing an effectual chopping or separation of the pulp.

Having thus described my invention, I claim as new and desire to secure by Letters Patent of the United States—

1. In a centrifugal amalgamator, the combination, with the frame, of the pan mounted on said frame and formed with a series of concentric steps the outer part of which beyond the last step is inclined upwardly and terminates in a downwardly-curved peripheral edge, substantially as shown and described.

2. The combination, with the frame, the rotary pan, the disk above the pan, and the plate secured at its outer edges to the said disk, with a space between the pan and disk, of the vent-tube K, extended through the plate and disk and communicating at its lower end with the space between the pan and disk, and through the plate and provided at its upper end with an enlargement, and the conical hood in said enlarged part with an air-space around the same, substantially as and for the purpose specified.

Signed at New York, in the county of New York and State of New York, this 18th day of October, A. D. 1888.

WILLIAM WHITE.

Witnesses:
FRANK A. FOUTS,
LEWIS L. PIERCE.